(12) United States Patent
Lee et al.

(10) Patent No.: US 12,496,312 B2
(45) Date of Patent: Dec. 16, 2025

(54) METHOD FOR ALLEVIATING CANCER-INDUCED PAIN THROUGH CONTROL OF PAIN SIGNALS IN CENTRAL NERVOUS SYSTEM

(71) Applicant: Industry-University Cooperation Foundation Hanyang University, Seoul (KR)

(72) Inventors: Sang Kyung Lee, Seoul (KR); Kun Ho Chung, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 791 days.

(21) Appl. No.: 17/787,702

(22) PCT Filed: Dec. 17, 2020

(86) PCT No.: PCT/KR2020/095148
§ 371 (c)(1),
(2) Date: Jun. 21, 2022

(87) PCT Pub. No.: WO2021/125920
PCT Pub. Date: Jun. 24, 2021

(65) Prior Publication Data
US 2023/0018392 A1 Jan. 19, 2023

(30) Foreign Application Priority Data
Dec. 18, 2019 (KR) .................. 10-2019-0169688

(51) Int. Cl.
| | |
|---|---|
| *C07H 21/02* | (2006.01) |
| *A61K 9/00* | (2006.01) |
| *A61K 31/713* | (2006.01) |
| *A61P 25/04* | (2006.01) |
| *C07H 21/04* | (2006.01) |

(52) U.S. Cl.
CPC .......... *A61K 31/713* (2013.01); *A61K 9/0043* (2013.01); *A61P 25/04* (2018.01)

(58) Field of Classification Search
CPC .................. C12N 15/113; C12N 2310/14
See application file for complete search history.

(56) References Cited

U.S. PATENT DOCUMENTS

| | | | | |
|---|---|---|---|---|
| 8,759,103 B2 * | 6/2014 | Kim | ................ | C07K 14/005 530/358 |
| 2011/0263676 A1 * | 10/2011 | Tan | ................ | C12N 15/1138 536/24.5 |
| 2014/0294727 A1 | 10/2014 | Narasimhaswamy et al. | | |

FOREIGN PATENT DOCUMENTS

| | | | |
|---|---|---|---|
| KR | 10-2015-0127618 A | 11/2015 | |
| WO | 2008/054544 A2 | 5/2008 | |
| WO | WO-2011076946 A2 * | 6/2011 | ........... A61K 31/185 |
| WO | 2019/190293 A1 | 10/2019 | |

OTHER PUBLICATIONS

Tan et al. (Gene Therapy, 2005, 12, 59-66).*
Garraway et al. (The Journal of Pain, vol. 10, No. 4 Apr. 2009: pp. 380-390).*
Kumar et al. (Nature, 448, 2007, 39-43).*
P-H Tan, et al., "Gene knockdown with intrathecal siRNA of NMDA receptor NR2B subunit reduces formalin-induced nociception in the rat", Gene Therapy, 2005, pp. 59-66, vol. 12.
Ying Li, et al., "Delivery of a peptide-drug conjugate targeting the blood brain barrier improved the efficacy of paclitaxel against glioma", Oncotarget, 2016, pp. 79401-79407, vol. 7, No. 48.
Sang-Soo Kim, et al., "Strategies for targeted nonviral delivery of siRNAs in vivo", Trends in Molecular Medicine, 2009, pp. 491-500, vol. 15, No. 11.
Irfan Ullah, et al., "A Positioning Device for the Placement of Mice During Intranasal siRNA Delivery to the Central Nervous System", Journal of Visualized Experiments, Aug. 2019, pp. 1-8, vol. 150, e59201.
Sang-Soo Kim, et al., "Strategies for targeted nonviral delivery of siRNAs in vivo", HHS Public Access, Author manuscript, Trends Mol. Med., May 22, 2015, pp. 1-21, vol. 15, No. 11.
Takanori Kanazawa, et al., "Cell-Penetrating Peptide-Modified Block Copolymer Micelles Promote Direct Brain Delivery via Intranasal Administration", Pharm. Res., 2011, pp. 2130-2139, vol. 28.
Chandrakantsing Vijaysing Pardeshi, et al., "Direct nose to brain drug delivery via integrated nerve pathways bypassing the blood—brain barrier: an excellent platform for brain targeting", Expert Opinion, Drug Deliv., 2013, pp. 1-16.
Eugene P. Chung, et al., "Targeting Small Molecule Delivery to the Brain and Spinal Cord via Intranasal Administration of Rabies Virus Glycoprotein (RVG29)-Modified PLGA Nanoparticles", Pharmaceutics, 2020, pp. 1-16, vol. 12, No. 93.
International Search Report for PCT/KR2020/095148 dated Apr. 8, 2021.

* cited by examiner

*Primary Examiner* — Amy Rose Hudson
(74) *Attorney, Agent, or Firm* — Sughrue Mion, PLLC (57) ABSTRACT

The present invention relates to a method for alleviating cancer-induced pain through the control of pain signals in the central nervous system. More specifically, the present invention provides an effect of effectively alleviating cancer-induced pain by blocking tumor progression- and pain-related nerve signal transduction by delivering siRNA to the brain through nose-to-brain drug delivery.

9 Claims, 7 Drawing Sheets
Specification includes a Sequence Listing.

SEQUENCE LISTING

```
<160> NUMBER OF SEQ ID NOS: 11

<210> SEQ ID NO 1
<211> LENGTH: 19
<212> TYPE: RNA
<213> ORGANISM: Artificial Sequence
<220> FEATURE:
<223> OTHER INFORMATION: NMDA specific siRNA sense sequence

<400> SEQUENCE: 1
ggaugagucc uccauguuc                                                  19

<210> SEQ ID NO 2
<211> LENGTH: 19
<212> TYPE: RNA
<213> ORGANISM: Artificial Sequence
<220> FEATURE:
<223> OTHER INFORMATION: NMDA specific siRNA antisense sequence

<400> SEQUENCE: 2
gaacauggag gacucaucc                                                  19

<210> SEQ ID NO 3
<211> LENGTH: 29
<212> TYPE: PRT
<213> ORGANISM: Artificial Sequence
<220> FEATURE:
<223> OTHER INFORMATION: RVG(rabies virus glycoprotein)

<400> SEQUENCE: 3

Tyr Thr Ile Trp Met Pro Glu Asn Pro Arg Pro Gly Thr Pro Cys Asp
1               5                   10                  15

Ile Phe Thr Asn Ser Arg Gly Lys Arg Ala Ser Asn Gly
            20                  25

<210> SEQ ID NO 4
<211> LENGTH: 19
<212> TYPE: PRT
<213> ORGANISM: Artificial Sequence
<220> FEATURE:
<223> OTHER INFORMATION: Ang-2 peptide

<400> SEQUENCE: 4

Thr Phe Phe Tyr Gly Gly Ser Arg Gly Lys Arg Asn Asn Phe Lys Thr
1               5                   10                  15

Glu Glu Tyr

<210> SEQ ID NO 5
<211> LENGTH: 10
<212> TYPE: PRT
<213> ORGANISM: Artificial Sequence
<220> FEATURE:
<223> OTHER INFORMATION: ApoE peptide

<400> SEQUENCE: 5
```

```
Leu Arg Lys Leu Arg Lys Arg Leu Leu Arg
1               5                   10

<210> SEQ ID NO 6
<211> LENGTH: 10
<212> TYPE: PRT
<213> ORGANISM: Artificial Sequence
<220> FEATURE:
<223> OTHER INFORMATION: B6 peptide

<400> SEQUENCE: 6

Cys Gly His Lys Ala Lys Gly Pro Arg Lys
1               5                   10

<210> SEQ ID NO 7
<211> LENGTH: 16
<212> TYPE: PRT
<213> ORGANISM: Artificial Sequence
<220> FEATURE:
<223> OTHER INFORMATION: CDX peptide

<400> SEQUENCE: 7

Phe Lys Glu Ser Trp Arg Glu Ala Arg Gly Thr Arg Ile Glu Arg Gly
1               5                   10                  15

<210> SEQ ID NO 8
<211> LENGTH: 39
<212> TYPE: PRT
<213> ORGANISM: Artificial Sequence
<220> FEATURE:
<223> OTHER INFORMATION: RDP peptide

<400> SEQUENCE: 8

Lys Ser Val Arg Thr Trp Asn Glu Ile Ile Pro Ser Lys Gly Cys Leu
1               5                   10                  15

Arg Val Gly Gly Arg Cys His Pro His Val Asn Gly Gly Gly Arg Arg
                20                  25                  30

Arg Arg Arg Arg Arg Arg Arg
                35

<210> SEQ ID NO 9
<211> LENGTH: 36
<212> TYPE: PRT
<213> ORGANISM: Artificial Sequence
<220> FEATURE:
<223> OTHER INFORMATION: CTX peptide

<400> SEQUENCE: 9

Met Cys Met Pro Cys Phe Thr Thr Asp His Gln Met Ala Arg Lys Cys
1               5                   10                  15

Asp Asp Cys Cys Gly Gly Lys Gly Arg Gly Lys Cys Tyr Gly Pro Gln
                20                  25                  30

Cys Leu Cys Arg
        35

<210> SEQ ID NO 10
<211> LENGTH: 7
<212> TYPE: PRT
<213> ORGANISM: Artificial Sequence
<220> FEATURE:
<223> OTHER INFORMATION: T7-HAI peptide

<400> SEQUENCE: 10

His Ala Ile Tyr Pro Arg His
```

```
<210> SEQ ID NO 11
<211> LENGTH: 12
<212> TYPE: PRT
<213> ORGANISM: Artificial Sequence
<220> FEATURE:
<223> OTHER INFORMATION: THR peptide

<400> SEQUENCE: 11

Thr Gly Asn Tyr Lys Ala Leu His Pro His Asn Gly
1               5                   10
```

METHOD FOR ALLEVIATING CANCER-INDUCED PAIN THROUGH CONTROL OF PAIN SIGNALS IN CENTRAL NERVOUS SYSTEM

CROSS REFERENCE TO RELATED APPLICATIONS

This application is a National Stage of International Application No. PCT/KR2020/095148 filed Dec. 17, 2020, claiming priority based on Korean Patent Application No. 10-2019-0169688 filed Dec. 18, 2019.

BACKGROUND

1. Field of the Invention

The present invention relates to a method for alleviating cancer-induced pain through the control of pain signals in the central nervous system.

2. Discussion of Related Art

According to efforts of national research on cranial nerve function and diseases, research on new drug candidates and diagnosis of brain diseases is currently being actively conducted, but research on the development of techniques for directly delivering nucleic acids/drugs to the brain composed of the blood vessel-brain barrier is lacking.

Tumor-derived pain occurs by inflammation-related cytokines produced by the inflammatory response around the tumor stimulating sensory nerves, and pain signals are transmitted through the spinal cord to the thalamus of the brain, then reach the anterior cingulate cortex (ACC) of the cerebrum to sense the pain signal. In order to apply a method of alleviating pain through the control of pain signals in clinical practice, there is a need for research on techniques for effectively delivering a drug to the central nervous system and the brain by systemic delivery through blood. Although many researchers have conducted research on the control of pain signals, the absence of effective brain-specific nucleic acid/drug delivery techniques makes it difficult to study pain signals in brain tissue. Further, research on the control of pain signals has focused primarily on suppressing an inflammatory response, which is the cause of pain, and this is primarily because there is a limitation in delivering drugs and genes to the central nervous system. In the case of anti-inflammatory preparations administered for the purpose of suppressing pain, various side effects, such as liver toxicity, have been reported in addition to the anti-inflammatory effect, and although research on the suppression of the pain signal system has been made by direct injection of drugs and genes into brain and spinal cord tissues, there are many problems in clinical application due to low delivery efficiency of drugs and genes into the central nervous system.

SUMMARY OF THE INVENTION

An object of the present invention is to provide a composition for alleviating cancer-induced pain by blocking nerve signal transduction in brain tissue in a pain environment through nose-to-brain drug delivery.

To achieve the object, the present invention provides a composition for alleviating a pain response in the brain, including a complex of small interfering RNA (siRNA) specific for an N-methyl-D-aspartate (NMDA) receptor and a brain-specific target peptide.

The present invention also provides a kit for nasal administration for alleviating a pain response in the brain, the kit including the composition for alleviating a pain response in the brain; and a nose-to-brain drug delivery device.

The present invention also provides a method for alleviating a pain response in the brain, the method including: intranasally administering an effective amount of the composition for alleviating a pain response in the brain to a subject in need thereof.

The present invention provides the effect of effectively alleviating cancer-induced pain by blocking tumor progression- and pain-associated nerve signalling by delivering the siRNA of an NMDA receptor (NR2B) to the brain through nose-to-brain drug delivery.

BRIEF DESCRIPTION OF THE DRAWINGS

(A) It shows the result of gel delayed analysis of an RVG9RC peptide and siRNA at various molar ratios. The RVG9RC peptide is complexed with 100 pmoles of siRNA at the specified concentrations.

(B) It shows the result of cytotoxicity measured by CCK-8 viability analysis 24 hours after transfection of an RVG9RC/siRNA nanocomplex into Neuro-2a cells. The RVG9RC peptide is complexed with 100 pmoles of siRNA at the specified peptide:siRNA molar concentrations. The relative percentage of cell viability is normalized with the mock group. $*p<0.05$, n.s.—not significant.

(C) It shows the result of flow cytometry analysis for the efficacy of siRNA delivery by the RVG9RC/siRNA nanocomplex. The RVG9RC peptide is complexed with 200 pmoles of FITC-labeled siRNA at the specified peptide:siRNA molar ratios. FIG. 1C is a representative histogram (left panel), cumulative data for the percentage of FITC-positive cells (middle panel) and average fluorescence intensity (right panel). $*p<0.05$, $**p<0.01$ vs mock group.

(D) It illustrates the gene expression suppression efficacy of the RVG9RC/siRNA nanocomplex prepared by peptide/siRNA at various molar ratios in Neuro-2a cells. The RVG9RC peptide is complexed with 200 pmoles of siRNA at the specified peptide:siRNA molar ratios. $*p<0.05$, $**p<0.01$ vs RVG9RC/siGFP group.

(E) It illustrates the downregulation of NR2B by an RVG9RC/siNR2B nanocomplex in Neuro-2a cells. $*p<0.05$, $**p<0.01$ vs mock. All data was obtained from 3 independent experiments, and is shown as mean±SD.

(A) It illustrates the in vivo distribution of intranasally-delivered Cy5-labeled siRNA (siCy5) complexed with RVG9RC. An organ fluorescence distribution is analyzed 24 hours after injection of an RVG9RC/siCy5 nanocomplex (left panel), and cumulative data for relative fluorescence intensity is normalized with an siCy5 group (right panel). $***p<0.001$ vs siCy5.

(B) It illustrates the gene expression suppression efficacy 24 hours after injection of the intranasally-delivered RVG9RC/siRNA nanocomplex in the cortex, hippocampus and thalamus. $*p<0.05$ vs RVG9RC/siGFP group.

(C) It illustrates the downregulation of NR2B 24 hours after injection of intranasally-delivered NR2B-targeting siRNA (siNR2B) complexed with the RVG9RC peptide in the cortex, hippocampus and thalamus. *p<0.05 vs RVG9RC/siGFP group. All data was obtained from 3 independent experiments including 6 animals in each group, and is shown as mean±SD.

(A) It illustrates changes in NR2B expression in the cortex, hippocampus and thalamus after cancer inoculation. Each piece of data is normalized with expression level on day 0. Data is shown as mean±SD. *p<0.05 and n.s.—not significant vs day 0.

(B) It illustrates the cumulative mechanical threshold (left panel) and delay time (right panel) of the hind paws inoculated with melanoma. Data is shown as median±SEM. *p<0.05 and n.s.—not significant vs day 0.

(C) It illustrates the downregulation of NR2B expression in the thalamus by the intranasally-delivered RVG9RC/siNR2B nanocomplex. ***p<0.001 and n.s.—not significant vs mock group. All data is shown as mean±SD.

(D) it illustrates the result of representative immunohistochemistry of the downregulation of NR2B expression in the thalamus. A thalamus tissue section is stained with an anti-NR2B antibody (green) and counterstained with Hoechst 33342 (blue). The scale bar is 20 μm.

(E) It illustrates a decrease in NR2B and pain-related molecule expression in the thalamus. Cumulative analytical data of a representative western blot image (left panel), NR2B (middle panel) and a p-ERK/t-ERK ratio (right panel) are normalized with the normal group. All data is shown as mean±SD.

(F) It illustrates the mechanical allodynia of a cancer-inoculated paw. (F) illustrates the cumulative mechanical threshold (left panel) and delay time (right panel). Data is shown as median±SEM. *p<0.001 and **p<0.0001. All data was obtained from 3 independent experiments, each including 7 animals per group.

(A, B) They show the gene relative expression of NR2B in the cortex (A) and hippocampus (B) by the intranasally-delivered RVG9RC/siNR2B nanocomplex. Each piece of data is normalized with the mock group, and is shown as mean±SD. Mock group vs *p<0.05, p<0.01, *p<0.001 and n.s.—not significant.

(C, D) They show the relative protein expression of NR2B in the cortex (C) and hippocampus (C) by the intranasally-delivered RVG9RC/siNR2B nanocomplex. A relative western blot image (left panel) and quantitative analysis data (NR2B (middle panel) and p-ERK/t-ERK ratio (right panel)) are normalized with β-actin. Data is shown as mean±SD, n.s.—not significant vs mock group.

DETAILED DESCRIPTION OF EXEMPLARY EMBODIMENTS

Hereinafter, the configuration of the present invention will be specifically described.

The present invention provides a composition for alleviating a pain response in the brain, including a complex of small interfering RNA (siRNA) specific for an N-methyl-D-aspartate (NMDA) receptor and a brain-specific target peptide.

The composition of the present invention is characterized by being able to alleviate a pain response by delivering siRNA specific for an NMDA receptor from a complex of the siRNA and a brain-specific target peptide to the brain through the nose-to-brain route.

Although there are no substantial research results for techniques for effectively delivering a gene and a drug to the central nervous system by nose-to-brain methods and intravenous injection yet and more technological developments are needed for clinical application, the present invention has established a technique for effectively delivering a gene and a drug to the central nervous system.

In addition, the present invention has developed a new perspective of treatment for pain control, and although the existing pain control is focused on the blocking of inflammation at a pain-occurring site and the blocking of signals at a pain-receiving site, a detailed mechanism for pain signal transduction may be elucidated in detail. Furthermore, unlike existing pain control, pain alleviation methods that control the pain transduction mechanism in the central nervous system may present new alternatives to pain signal mechanism research and treatment method development.

Further, in the existing pain signal mechanism research, research has been conducted through an animal model with a genetic deficiency and the selective suppression of a pain signaling gene, but since the genes involved in pain signals also play an important role in other neural signals, there have been many side effects other than the study on the pain response itself. However, the present invention can present a research method on the mechanism for pain signal transduction through the present invention while minimizing the effect on normal neural signals by temporarily suppressing the expression and activity of pain signaling genes by central nervous system-specific delivery of siRNA and inhibitory drugs.

In addition, the present invention is characterized by being able to be applied to studies on other neural signal transduction mechanisms in addition to pain signals through central nervous system-specific delivery of drugs and siRNA.

As used herein, the term "N-methyl-D-aspartate (NMDA) receptor" refers to a part of a glutamatergic neurotransmitter-receptor system, the so-called NMDA-receptor/ion-channel complex. It includes different binding sites located inside and outside the ion-channel. The NMDA receptor is a postsynaptic ionotropic receptor that is particularly responsive to excitatory amino acids, glutamate and glycine, and a synthetic compound NMDA. The NMDA receptor regulates the flow of both divalent and monovalent ions into postsynaptic neurons through receptor-associated channels. The NMDA receptor is involved during development and may be involved in experience-dependent synaptic modifications when specifying neuronal structure and synaptic connectivity. Furthermore, the NMDA receptor is thought to be involved in long-term potentiation and central nervous system disorders.

As used herein, the term "pain" includes, but is not limited to, inflammatory pain, neuropathic pain, acute pain, chronic pain, visceral pain, migraine pain and cancer pain. Preferably, the pain may be cancer-induced pain.

As used herein, the "small interfering RNA specific for the N-methyl-D-aspartate (NMDA) receptor" refers to a nucleic acid material that specifically binds to mRNA encoding the NMDA receptor to suppress the expression thereof.

As used herein, the term "siRNA" refers to double-stranded RNA specifically binding to mRNA having a sequence complementary to a small RNA fragment having a size of 21 to 25 nucleotides produced by a dicer to suppress the expression thereof. For the purpose of the present invention, it refers to double-stranded RNA specifically binding to mRNA to suppress the expression of the gene. siRNA may be chemically or enzymatically synthesized. A method of preparing siRNA is not particularly limited, and a method known in the art may be used.

The siRNA used in the present invention may be a complete form having polynucleotide pairing by itself, that is, a form in which siRNA is directly synthesized in a test tube and then introduced into cells via a transformation process, or in a form in which one single-chain oligonucleotide fragment and a reverse complement thereof can be derived from a single-chain polynucleotide separated by a spacer so as to have such a morphology after being administered in vivo, for example, a form in which an siRNA expression vector prepared such that siRNA is intracellularly expressed, or a PCR-induced siRNA expression cassette is introduced into cells via a transformation or infection process. The determination of how to prepare siRNA and introduce the siRNA into cells or an animal may vary depending on the purpose and the cell biological function of a target gene product.

In an exemplary embodiment of the present invention, as siRNA specific for the NMDA receptor, 5'-GGAUGAGU-CCUCCAUGUUC-3' (sense sequence: SEQ ID NO: 1) and 5'-GAACAUGGAGGACUCAUCC-3' (antisense sequence: SEQ ID NO: 2) were used, but the siRNA is not limited thereto.

In the present invention, the siRNA specifically binds to a brain-specific target peptide to form a complex.

As the brain-specific target peptide, it is possible to use a rabies virus glycoprotein (RVG) (SEQ ID NO: 3, YTIWMPENPRPGTPCDIFTNSRGKRASNG), Ang-2 (LDR1 target: TFFYGGSRGKRNNFKTEEY, SEQ ID NO: 4), ApoE (LDLR target: LRKLRKRLLR, SEQ ID NO: 5), B6 (hTfR target: CGHKAKGPRK, SEQ ID NO: 6), CDX (nAchR target: FKESWREARGTRIERG, SEQ ID NO: 7), RDP (nAchR target: KSVRTWNEIIPSKGCLRVG-GRCHPHVNGGGRRRRRRRRR, SEQ ID NO: 8), CTX (MMP-2 target: MCMPCFTTDHQ-MARKCDDCCGGKGRGKCYGPQCLCR, SEQ ID NO: 9), T7-HAI (TfR target: HAIYPRH, SEQ ID NO: 10) and THR (TfR target: TGNYKALHPHNG, SEQ ID NO: 11), and the like, but the brain-specific target peptide is not limited thereto.

In the complex of the present invention, a cell penetrating peptide may be additionally bound to a brain-specific target peptide.

The cell penetrating peptide may be 5 to 11 polyarginine (R) residues. More preferably, the cell penetrating peptide may be 9R.

The complex of the present invention may be prepared by mixing siRNA specific for the NMDA receptor and the brain-specific target peptide (cell penetrating peptide) at a molar ratio of 1:10 to 40. Specifically, the complex may be prepared by mixing the siRNA and the peptide at a molar ratio of 1:10, 1:20 or 1:40. When the molar ratio is within the above range, siRNA may be effectively delivered to the brain through the nose-to-brain route.

According to an exemplary embodiment of the present invention, a complex may be prepared by mixing siRNA specific for the NMDA receptor and the brain-specific target peptide (cell penetrating peptide) at a molar ratio of 1:10 to 40 and reacting the resulting mixture at room temperature for 10 minutes to 30 minutes.

The composition for alleviating a pain response in the brain of the present invention may additionally include a pharmaceutically acceptable carrier, excipient or diluent, and the carrier may include a non-naturally occurring carrier. Specifically, the pharmaceutical composition may be used by being formulated in the form of an oral formulation such as a powder, a granule, a pill, a capsule, a suspension, an emulsion, a syrup, and an aerosol, an external preparation, a suppository, and a sterile injection solution, according to a typical method. Examples of a carrier, an excipient or a diluent which may be included in the pharmaceutical composition include lactose, dextrose, sucrose, sorbitol, mannitol, xylitol, erythritol, maltitol, starch, acacia rubber, alginate, gelatin, calcium phosphate, calcium silicate, cellulose, methyl cellulose, microcrystalline cellulose, polyvinyl pyrrolidone, water, methyl hydroxybenzoate, propyl hydroxybenzoate, talc, magnesium stearate, and mineral oil. When the pharmaceutical composition is formulated, the pharmaceutical composition may be prepared using a diluent or excipient, such as a filler, an extender, a binder, a wetting agent, a disintegrant, and a surfactant, which is typically used in the preparation of the pharmaceutical composition. A solid preparation for oral administration includes a tablet, a pill, a powder, a granule, a capsule, and the like, and the solid formulation may be prepared by mixing at least one excipient, for example, starch, calcium carbonate, sucrose or lactose, gelatin, and the like. Furthermore, in addition to simple excipients, lubricants such as magnesium stearate and talc may also be used. A liquid preparation for oral administration corresponds to a suspension, a liquid for internal use, an emulsion, a syrup, and the like, and the liquid preparation may include various excipients, for example, a wetting agent, a sweetener, an aroma, a preservative, and the like, in addition to water and liquid paraffin which are typically used simple diluents. A preparation for parenteral administration may include an aqueous sterile solution, a non-aqueous solvent, a suspension, an emulsion, a freeze-dried preparation, and a suppository. Further, as the non-aqueous solvent and the suspension, it is possible to use propylene glycol, polyethylene glycol, a vegetable oil such as olive oil, an injectable ester such as ethyl oleate, and the like. As a base of the suppository, it is possible to use Witepsol, Macrogol, Tween 61, cacao butter, laurin fat, glycerogelatin, and the like.

The content of the carrier, excipient or diluent included in the pharmaceutical composition of the present invention is not particularly limited, but the carrier, excipient or diluent may be included in a content of 0.0001 to 50 wt %, more preferably 0.01 to 10 wt % based on the total weight of a final composition, but the content is not limited thereto.

The pharmaceutical composition of the present invention may be administered in a pharmaceutically effective amount. The "pharmaceutically effective amount" refers to an amount sufficient to treat or prevent a disease at a reasonable benefit/risk ratio applicable to medical treatment or prevention, and an effective dose level may be determined according to factors including disease severity, drug activity, the patient's age, body weight, health, and gender, patient sensitivity to drug, time of administration, administration route and excretion rate of the composition of the present invention used, treatment duration, and a drug used in combination with or simultaneously with the composition of the present invention used and other factors well known in the medical field. The pharmaceutical composition of the present invention may be administered as an individual therapeutic agent or in combination with other therapeutic agents, may be administered sequentially or simultaneously with therapeutic agents in the related art, and may be administered in a single dose or multiple doses.

The dose of the pharmaceutical composition of the present invention may be determined by those skilled in the art in consideration of the purpose of use, the degree of drug toxicity, the patient's age, body weight, gender, medical history, the type of material used as an active ingredient, and the like. For example, the pharmaceutical composition of the present invention may be administered at 10 to 100 mg/kg, more preferably 10 to 30 mg/kg, and the frequency of administration of the pharmaceutical composition of the present invention is not particularly limited, but the pharmaceutical composition of the present invention may be administered once to three times a day, or may be administered several times by divided doses.

The present invention also relates to a kit for nasal administration for alleviating a pain response in the brain, including the composition for alleviating a pain response in the brain; and a nose-to-brain drug delivery device.

The composition for alleviating a pain response in the brain of the present invention may be sprayed via the nose-to-brain route of administration through a drug delivery device for nose-to-brain delivery.

Figure 8:
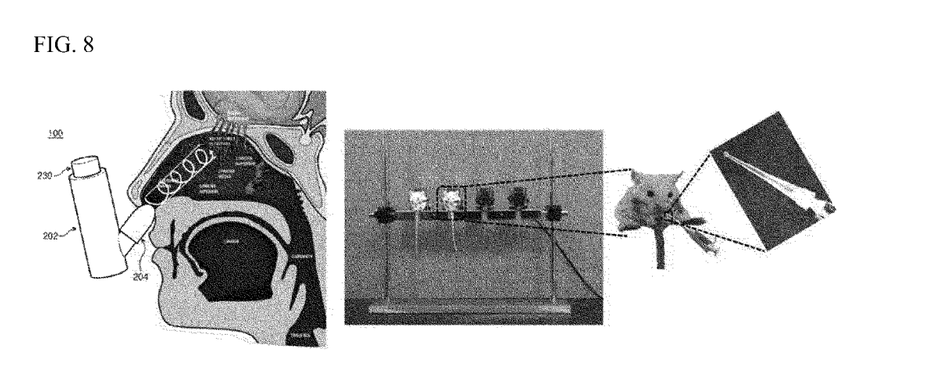
FIG. 8 is a view (left panel) for describing a method of using a drug delivery device for nasal cavity-brain administration of the present invention and a view (right panel) illustrating a process of delivering the NMDA receptor-siRNA/RVG9R nanocomplex of the present invention to a mouse animal model using a position correction device.

As the drug delivery device for nose-to-brain delivery, a known nebulizer type may be used. Alternatively, the drug delivery device for nose-to-brain delivery in FIG. 8 may be used. One end of the drug delivery device 100 of the present invention may be inserted into the entrance of the nasal cavity. By pushing a compressor 230 in a state where one end of the drug delivery device 100 is inserted into the entrance of the nasal cavity, a drug stored in a lyophilized form is thawed and sprayed into the nasal cavity in a spiral form (see white arrow). The drug sprayed into the nasal cavity may improve the nose-to-brain drug delivery rate by accurately reaching a nose-to-brain drug delivery spot.

In addition, when the drug delivery device of the present invention is used, the nose-to-brain drug delivery effect may be maximized when the drug delivery device is used in a state where a subject, for example, the subject's head, is maintained in a mecca position. Drug injection in the mecca position may provide an effect of eliminating influx into other organs by allowing the drug to be intensively delivered to the brain through the nasal cavity. In this case, the mecca position may refer to a posture in which the subject's head faces the chest.

Furthermore, when the nose-to-brain drug delivery device of the present invention is used, it may be effective to provide a drug to a subject by inducing the above-described mecca position, for example, when the subject is asleep or anesthetized, or unconscious.

The present invention also provides a method for alleviating a pain response in the brain, the method including: intranasally administering an effective amount of the composition for alleviating a pain response in the brain to a subject in need thereof.

The composition for alleviating a pain response in the brain may be loaded in an injection device provided with a support part capable of supporting the composition, and nasally administered.

According to an exemplary embodiment of the present invention, the composition may be loaded in a lyophilized drug container of the above-described nose-to-brain drug delivery device, and nasally administered.

The nasal administration may be performed in a sleeping, anesthetized or unconscious state of a subject.

The pain in the brain may be cancer-induced pain.

The subject may be a mammal such as a dog, a cat, a rat, a mouse, and a human, but is not limited thereto.

Hereinafter, the present invention will be described in more detail through Examples. These Examples are provided only for more specifically describing the present invention, and it will be obvious to a person with ordinary skill in the art to which the present invention pertains that the scope of the present invention is not limited by these Examples according to the gist of the present invention.

EXAMPLES

<Example 1> Target Gene Selection of Therapeutic Nucleic Acid for Alleviating Pain Response and Verification of Gene Suppression Efficacy of Therapeutic Nucleic Acid First, which receptor among various receptors expressed in the brain is directly involved in a pain response to alleviate the pain response, and whether the alleviation of the pain response could be induced by suppressing the expression of the receptor were investigated. It is known that COX-2, which is produced by stimulating peripheral nerves through the expansion of tumor cells, plays an important role in a pain response caused by tumors among various pain responses, and various previous studies have reported that, in pain signal transduction in peripheral nerves, N-methyl-D-aspartate (NMDA) in brain nerve cells stimulates NMDA receptors to ultimately transmit the pain signals. In particular, in an animal model in which the deletion of the NMDA receptor was induced, behavioral experiments investigating the sensitivity of pain after the onset of pain by injection of a pain-inducing material showed significant results, and through this, a positive effect on the alleviation of the pain response was expected when the expression of the NMDA receptor was suppressed by a therapeutic nucleic acid.

Thus, after small interfering RNA (siRNA, sense sequence: 5'-GGAUGAGUCCUCCAUGUC-3', SEQ ID NO: 1, antisense sequence: 5'-GAACAUGGAGGACU-CAUCC-3', SEQ ID NO: 2) for the NMDA receptor was synthesized, it was investigated whether the expression of the NMDA receptor was suppressed by the synthesized therapeutic nucleic acid by treating a Neuro-2A cell line, which is a murine neuroblastoma cell line, with the siRNA.

For this purpose, RVG9RC and RVM9RC peptides were synthesized by LugenSci (Bucheon, Gyeonggi-do, Korea) as described in previous studies (Kumar P et al., Nature. 2007 Jul. 5; 448(7149):39-43; Kim J et al., Mol Ther Nucleic Acids. 2016; 5:e280, RVG: 5'-YTIWMPEN-PRPGTPCDIFTNSRGKRASNG-3', SEQ ID NO: 3)). siRNA (siRN2B) SOD1 (siSOD1) and GFO (siGFP) targeting NR2B were synthesized by Bioneer (Seoul, Korea) (Kumar P et al., Nature. 2007 Jul. 5; 448 (7149): 39-43). Cy5 and FITC-labeled siRNAs (siCy5 and siFITC) targeting firefly luciferase were synthesized by Bioneer (Kim S S et al., Mol Ther. 2010 May; 18 (5): 993-1001).

For electrophoretic mobility shift assay (EMSA), 100 pmoles of siRNA in 100 μl of nuclease-free PBS was reacted with the RVG9RC or RVM9RC peptide included in 100 μl of nuclease-free PBS at a peptide:siRNA molar ratio of 0:40 at room temperature for 15 minutes. The sample was electrophoresed on 2% agarose gel and analyzed using the Kodak GelDoc Imaging System.

A murine neuroblastoma cell line Neuro-2a, a murine melanoma cell line B16F10 and a murine preadipocyte line 3T3L1 were obtained from ATCC and cultured in Dulbecco's Modified Eagle's Medium supplemented with 10% fetal bovine serum and penicillin-streptomycin (100 IU/ml). All the cell lines were cultured in a humidified incubator at 37° C. and 5% $CO_2$. Cytotoxicity was analyzed using a CCK-8 assay kit (Dojindo, Laboratories, Kumamoto, Japan) 24 hours after transfection according to the manufacturer's instructions.

For in vitro siRNA transfection in cell level experiments, FITC-labeled siRNA (siFITC), SOD1-targeted siRNA (siSOD1), NR2B-targeted siRNA (siNR2B) and GFP-targeted siRNA (siGFP) were complexed with the RVG9RC or RVM9RC peptide at a peptide:siRNA molar ratio of 10 to 40. Peptide-siRNA complexes were added to cultured Neuro-2a cells in 12-well plates at a density of $1 \times 10^5$ cells/ml. Cellular uptake of siFITC was assessed by FACS Calibur (BD Biosciences, Franklin Lakes, NJ) 24 hours after transfection and analyzed with Flowjo software. A decrease in gene expression in SOD1 or Neuro-2a cells was analyzed with the ABI 7500 Real-Time PCR System (Applied Biosystems, Foster City, CA) using a Sensifast SYBR Lo-ROX mix (Bioline, London, UK) 24 hours after transfection. Gene expression was normalized with murine GAPDH mRNA levels.

For animal experiments, 5-week-old male C57BL/6 mice were obtained from Orient Bio (Seoul, Korea). All animals were housed in a pathogen-free facility with a 12-hour light/dark cycle, and free access to food and water was provided. To model a cancer pain model, $3 \times 10^5$ B16F10 cells were suspended in 15 μl of PBS, and subcutaneously injected into the plantar part of the left hind paw under isoflurane anesthesia as described in a previous study (Tabata M et al., J Anesth. 2012 August; 26(4):545-51). All experimental procedures were approved by the Institutional Animal Care and Use Committee (IACUC) of Hanyang University.

For intranasal delivery of siRNA in animal experiments, 600 pmoles of Cy5-labeled siRNA (siCy5), siSOD1, siGFP and siNR2B were dissolved in nuclease-free PBS at a concentration of 100 μM, and complexed with the RVG9RC or RVM9RC peptide at a weight ratio of 20:1 at room temperature for 30 minutes. Peptide-siRNA complexes were intranasally injected into C57BL/6 mice transplanted with melanoma under zolazepam anesthesia three times every 24 hours. All injections were performed using Jerryseat (Signet Biotech, Seoul, Korea) as described in previous studies (Beloor J et al., Cell Host Microbe. 2018 Apr. 11; 23(4): 549-556 e3.; Ullah I et al., JoVE. 2019 (150):e59201). To evaluate the pharmacological localization of siCy5, the brain, sinuses, lungs, liver, spleen and kidneys were isolated 24 hours after the last injection and washed with PBS. Fluorescence signals were assessed using IVIS Lumina series III (Perkin Elmer, Waltham, MA) and analyzed using Image J software. To evaluate the reduction of cancer pain by siNR2B, 600 pmoles of siNR2B were complexed with the RVG9RC peptide at a peptide:siRNA molar ratio of 20:1 and the resulting complex was intranasally inoculated into hind paw melanoma mice every 24 hours for 2 weeks. Two weeks after the initial inoculation, all animals were analyzed for behavioral changes due to cancer inoculation.

For gene expression analysis at the RNA level, total mRNA was extracted from each brain region including the cortex, hippocampus, thalamus, olfactory bulb, cerebellum and brainstem using an RNAiso kit (Takara Bio Inc., Kusatsu, Japan). cDNA was synthesized using an iScript cDNA synthesis kit (Bio-Rad Laboratories, Hercules, CA) with 500 ng of mRNA. Quantitative gene expression of SOD1 and NR2B was analyzed by the ABI 7500 Real-Time PCR System (Applied Biosystems, Foster City, CA) using a Sensifast SYBR Lo-ROX mix (Bioline, London, UK). To assess gene expression at the protein level, total protein lysates from each brain region were extracted using 100 μl of RIPA buffer (Thermo Scientific, Waltham, MA) and transferred to a nitrocellulose transfer membrane. Blots were probed with a mouse polyclonal antibody targeting murine NR2B and a rabbit polyclonal antibody against mouse ERK and phosphorylated ERK. The probed blots were treated with a secondary rabbit polyclonal antibody against either murine IgG or rabbit IgG bound to HRP. Blots were developed using an ECL Western blotting substrate. In addition, immunohistochemistry was performed on paraffin-embedded brain sections with a mouse polyclonal antibody against murine NR2B and a secondary rabbit antibody against FITC-conjugated murine IgG. Fluorescence signals in the stained sections were assessed with a Leica TSP-SP5 confocal microscope and analyzed with ImageJ software.

A mechanical withdrawal threshold was measured using an electronic von Frey apparatus (Dynamic Plantar Aesthesiometer, Ugo Basile) as described in a previous study (Ko H G et al., Mol Pain. 2016; 12.). At least 2 hours before the experiment, mice were placed on the wire mesh of the device to allow them to acclimatize to the equipment. Briefly, an electronic van Frey tip was placed on the sole of the left hind paw of a mouse, and an augmentation force was applied at a rate of 0.5 g/s. The mechanical withdrawal threshold was measured from the force applied when the mouse withdrew its paw (g). The cut-off time was 20 s (10 g). The experiment was repeated at intervals of 5 and 10 minutes between measurements. The maximum and minimum values were excluded, and the average of the remaining three values was used as the mechanical threshold.

Data was statistically analyzed using the Mann-Whitney U test and the unpaired T test to evaluate differences between groups, and two-way ANOVA to evaluate interactions in different groups using Graphpad Prism 8 software. $P<0.05$ was considered statistically significant.

Figure 1:
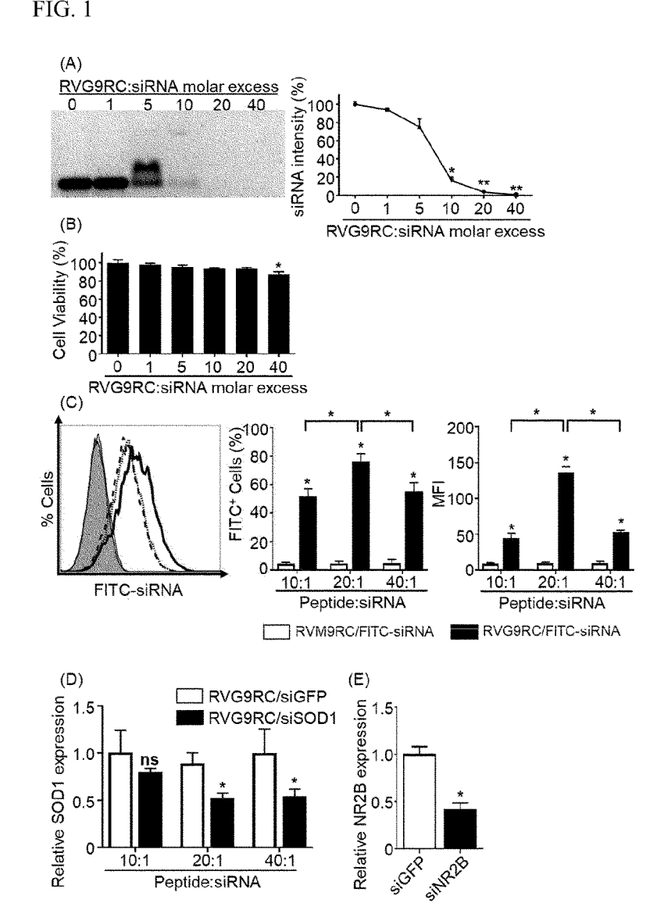
FIG. 1 illustrates the delivery and gene expression suppression of siRNA using RVG9RC in Neuro-2a cells.

<Experimental Example 1> Verification of Gene Suppression Efficacy of Therapeutic Nucleic Acid for Alleviating Gene Pain Response in Neuronal Cell Lines As illustrated in FIG. 1A, the RVG9RC peptide was successfully condensed with siRNA at a peptide:siRNA molar ratio of 10:1.

Therefore, the cytotoxic level of a RVG9RC/siRNA nanocomplex including a peptide:siRNA molar ratio of 0:1 to 80:1 was tested in the murine neuroblastoma cell line Neuro-2a. As illustrated in FIG. 1B, the RVG9RC/siRNA nanocomplex did not show significant cytotoxicity up to a peptide:siRNA molar ratio of 40:1.

Next, the siRNA delivery efficacy of the RVG9RC/siRNA nanocomplex at various molar ratios was evaluated. For this purpose, FITC-labeled siRNA (FITC-siRNA) was complexed with the RVG9RC peptide at a molar ratio of 10:1, 20:1 and 40:1, and the resulting complex was transferred to the Neuro-2A cell line. As illustrated in FIG. 1C (right panel), FITC-positivity in the molar ratio groups of 10:1, 20:1 and 40:1 was 52%, 74% and 9%, respectively.

Furthermore, the expression suppression ability of the RVG9RC/siRNA nanocomplex was 32%, 45% and 44% in the molar ratio groups of 10:1, 20:1 and 40:1, respectively (FIG. 1D).

Further, the expression suppression ability of siRNA targeting NR2B complexed with RVG9R in Neuro-2A cells was confirmed (FIG. 1E).

In conclusion, siRNA delivery and gene expression suppression of the RVG9RC/siRNA nanocomplex in Neuro-2A cells were successfully reproduced as specified in previous reports.

Figure 2:
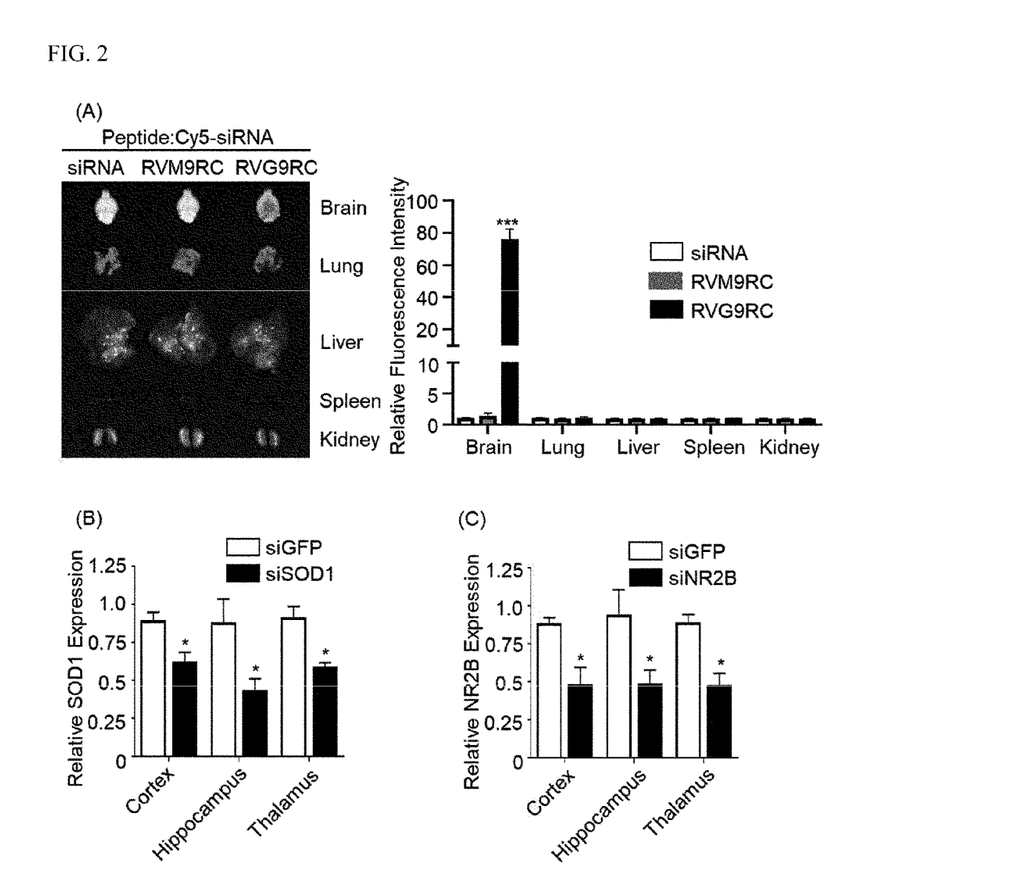
FIG. 2 shows that the intranasally-delivered RVG9RC/siRNA nanocomplex is capable of specific localization and gene expression suppression in the brain.

<Experimental Example 2> Localization of Intranasally-Delivered Therapeutic Nucleic Acid in Brain for Alleviating Pain Response and Verification of Efficacy of Gene Suppression Induced in Various Brain Regions To confirm the brain-specific localization of an intranasally-delivered RVG9RC/siRNA nanocomplex, Cy5-labeled siRNA (siCy5) was complexed with RVG9RC or RVM9RC and intranasally inoculated into C57BL/6 mice. 24 hours after intranasal inoculation, strong fluorescence was confirmed in a brain tissue of the RVG9RC/siCy5 group (FIG. 2A).

Next, the expression suppression efficacy of the RVG9RC/siRNA nanocomplex was tested in the cortex, hippocampus and thalamus. For this purpose, SOD1-targeted siRNA complexed with RVG9RC (siSOD1) was intranasally inoculated into C57BL/6 mice. At 24 hours after inoculation, 34%, 58% and 44% suppression of SOD1 expression was confirmed in the cortex, hippocampus and thalamus, respectively (FIG. 2B).

In addition, as a result of testing the efficacy of suppressing NR2B expression by the intranasally-delivered RVG9RC/siNR2B nanocomplex in C57BL/6 mice, 54%, 56% and 49% suppression of NR2B expression was found in the cortex, hippocampus and thalamus, respectively (FIG. 2C).

Figure 3:
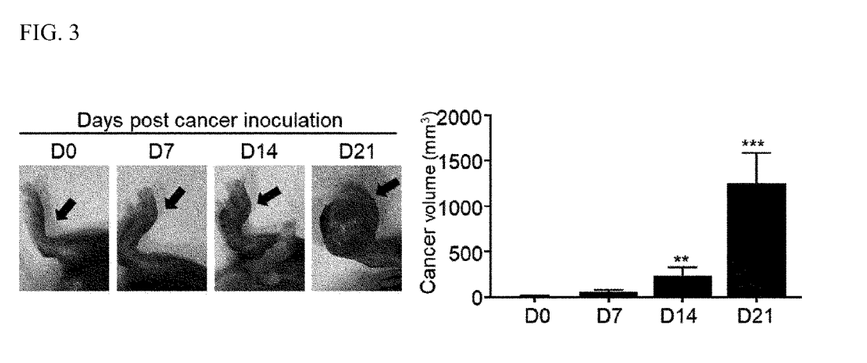
FIG. 3 illustrates a melanoma xenografted to the right hind paws of C57BL/6 mice after inoculation with a B16F10 cell line. It shows a representative image after cancer inoculation (left panel) and an accumulated cancer measurement (right panel). Data is shown as median±SEM. p<0.01 and *p<0.001 vs normal group.
Figure 4:
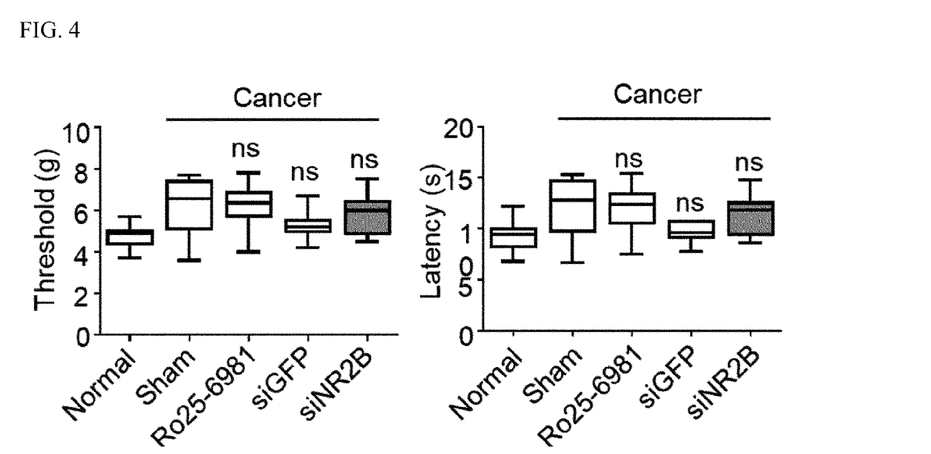
FIG. 4 shows that pain sensitivity induced by melanoma on the hind paw does not affect the normal paw (left behind paw).

<Experimental Example 3> Verification of Gene Suppression Efficacy of Therapeutic Nucleic Acid for Alleviating Pain Response in Animal Model Mechanical allodynia was induced in the hind paw melanoma model, and the B16F10 murine melanoma cell line was subcutaneously injected into the hind paws of C57BL/6 mice, and the size of the cancer was measured on days 7, 14 and 21. The hind paws into which melanoma was subcutaneously injected significantly grew on day 21 after inoculation (FIG. 3). Furthermore, pain sensitivity induced by hind paw melanoma did not affect the normal paw (left hind paw) (FIG. 4).

Previous studies evaluated NR2B as a major factor in pain signal transduction, and overexpression of NR2B was observed in the spinal cord.

Figure 5:
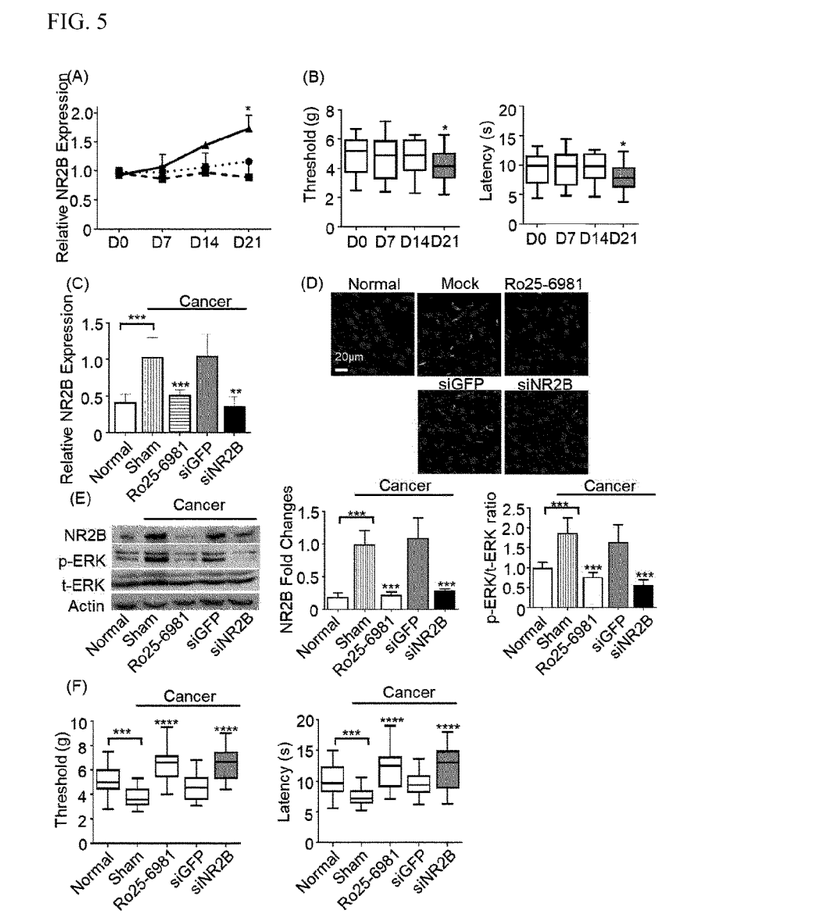
FIG. 5 shows that the downregulation of NR2B expression by the intranasally-delivered RVG9RC/siNR2B nanocomplex diminishes cancer-induced pain sensitivity.

Another study reported the thalamus as a major route for pain signal transduction. Therefore, NR2B expression was analyzed on days 7, 14 and 21 after melanoma inoculation in the cortex, hippocampus and thalamus, and significant overexpression of NR2B was found in thalamus (FIG. 5A).

In addition, the mechanical threshold of the hind paw into which melanoma was inoculated was evaluated on days 7, 14 and 21 after cancer inoculation. As a result, it was found that the hind paw into which melanoma was inoculated had a significant decrease in mechanical threshold and delay time on day 21 after inoculation (FIG. 5B).

<Experimental Example 4> Verification of Efficacy of Intranasally-Delivered Therapeutic Nucleic Acid for Alleviating Pain Response in Thalamus on Pain Alleviation Signal Transduction The therapeutic effect of RVG9RC/siNR2B on cancer-induced pain was investigated. For this purpose, NR2B-targeted siRNA complexed with RVG9RC was intranasally inoculated into the hind paw melanoma model, and the therapeutic effect was confirmed on day 21 after cancer inoculation. A decrease in expression of NR2B in the thalamus was demonstrated by qPCR and immunohistochemistry in thalamus tissue (FIGS. 5C and 5D). The expression of NR2B was increased approximately 2-fold in the hind paw cancer model compared to normal animals (FIG. 5E). Furthermore, a decrease in expression of NR2B was confirmed in immunohistochemistry in thalamus tissue sections (FIG. 5D).

Then, it was investigated whether a decrease in expression of NR2B leads to a decrease in NR2B-associated signal transduction in the thalamus region. As a result, it was confirmed that phosphorylated ERK, a marker for downstream NR2B-associated signaling, was decreased in the siNR2B-treated group compared to the control (FIG. 5E). In addition, it was found that molecular reduction of NR2B by siRNA resulted in improved behavioral evaluation. Mechanical allodynia in the siNR2B-treated group was investigated as an improvement in pain sensitivity compared to the control (FIG. 5F).

As a result, intranasally-delivered RVG9RC/siNR2B attenuates NR2B-mediated pain signal transduction in the thalamus.

Figure 6:
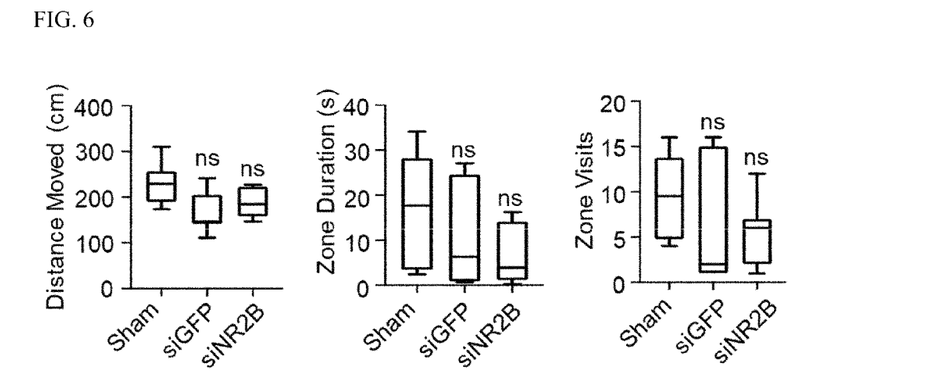
FIG. 6 shows that a reduction in NR2B-expression by the intranasally-delivered RVG9RC/siNR2B nanocomplex does not affect cognitive function. Open field test results of RVG9RC/siNR2B-treated mice. Cumulative data for distance moved (left panel), zone duration (middle panel) and zone visits (right panel) is shown as median±SEM, and is each obtained from 8 animals per group.

<Experimental Example 5> Verification of Efficacy of Intranasally-Delivered Therapeutic Nucleic Acid for Alleviating Pain Response in Cortex and Hippocampus on Pain Alleviation Signal Transduction The NMDA receptor plays an important role in cognitive function in the cortex and hippocampus. Therefore, it was investigated whether the decrease in expression of NR2B by RVG9RC/siNR2B inoculation affects normal cognitive function. For this purpose, RVG9RC/siNR2B was inoculated into normal C57BL/6 mice, and it was confirmed that there was no difference in cognitive function in the siNR2B-treated group from the sham control (FIG. 6).

Figure 7:
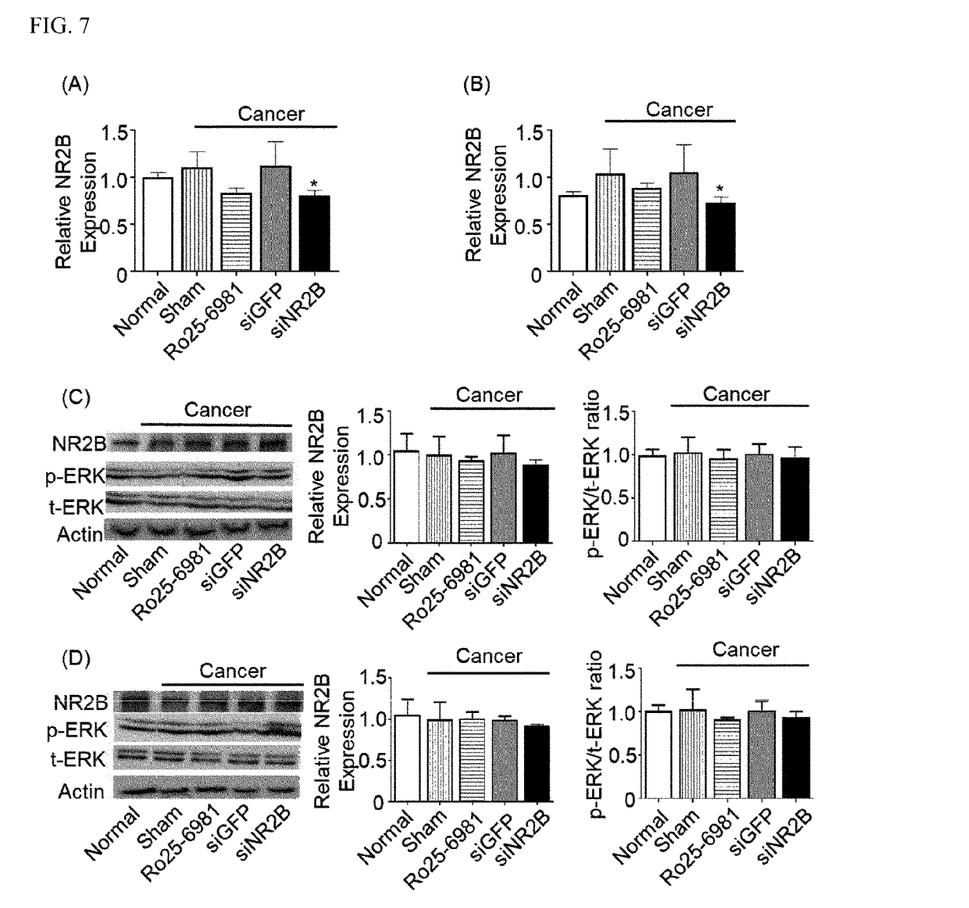
FIG. 7 shows that NR2B down-expressed by the intranasally-delivered RVG9RC/siNR2B nanocomplex has little effect on NR2B-related signal transduction in the cortex and hippocampus.

Furthermore, the decrease in expression of NR2B in a hind paw melanoma cancer model was evaluated. As a result, it was confirmed that the expression of NR2B was reduced by about 10% in the cortex (FIG. 7A) and hippocampus (FIG. 7B). Moreover, siNR2B treatment induced 24% and 25% expression suppression in the cortex (FIG. 7A) and hippocampus (FIG. 7B), respectively, compared to the expression suppression observed in the cancer-induced pain control. However, NR2B expression levels were not significantly downregulated in the cortex and hippocampus, as they had 20% and 12% expression suppression efficacy, respectively, compared to the normal group (FIGS. 7A and 7B). In previous studies, NR2B-associated signal transduction alters postsynaptic density-95 (PSD-95), cAMP response element binding protein (CREB) and induced ERK routes. Thus, intranasal inoculation of siNR2B successfully downregulated the NR2B-mediated ERK route in the thalamus (FIG. 7E), but did not show significant changes in the cortex (FIG. 7C) and hippocampus (FIG. 7D).

Therefore, it can be seen that intranasally-delivered RVG9RC/siNR2B did not affect the function of NR2B (signal transduction associated with NR2B) in the cortex and hippocampus.

The present invention can be used in the preparation of medicaments for the treatment of cancer-induced pain.

What is claimed is:

1. A composition for alleviating a pain response in a brain, comprising a complex of a small interfering RNA (siRNA) specific for an N-methyl-D-aspartate (NMDA) receptor and a brain-specific target peptide,
   wherein the siRNA specific for the NMDA receptor consists of the nucleic acid sequences of SEQ ID NO: 1 and SEQ ID NO: 2.

2. The composition of claim 1, wherein the brain-specific target peptide is one or more selected from the group consisting of a rabies virus glycoprotein (RVG) (SEQ ID NO: 3), Ang-2 (SEQ ID NO: 4), ApoE (SEQ ID NO: 5), B6 (SEQ ID NO: 6), CDX (SEQ ID NO: 7), RDP (SEQ ID NO: 8), CTX (SEQ ID NO: 9), T7-HAI (SEQ ID NO: 10) and THR (SEQ ID NO: 11).

3. The composition of claim 1, wherein the complex further comprises a cell penetrating peptide.

4. The composition of claim 3, wherein the cell penetrating peptide is 5 to 11 polyarginine residues.

5. The composition of claim 1, wherein the complex is prepared by mixing the siRNA specific for the NMDA receptor and the brain-specific target peptide at a molar ratio of 1:10 to 40.

6. The composition of claim 1, wherein the pain in the brain is cancer-induced pain.

7. The composition of claim 1, wherein the composition is delivered to the brain through the nose-to-brain route.

8. A kit for nasal administration for alleviating a pain response in the brain, comprising
   the composition for alleviating a pain response in the brain of claim 1; and
   a nose-to-brain drug delivery device.

9. A method for alleviating a pain response in the brain, comprising
   intranasally administering a pharmaceutically effective amount of the composition for alleviating a pain response in the brain of claim 1 to a subject in need thereof.

* * * * *